(12) United States Patent
Bryckaert et al.

(10) Patent No.: US 11,985,982 B2
(45) Date of Patent: May 21, 2024

(54) CUTTABLE LIVE LEAVEN BLOCK

(71) Applicant: LESAFFRE ET COMPAGNIE, Paris (FR)

(72) Inventors: Emilie Bryckaert, Wambrechies (FR); Florence Delchambre, Quesnoy-sur-Deule (FR); Pauline Semeria, Lamballe-Armor (FR)

(73) Assignee: LESAFFRE ET COMPAGNIE, Paris (FR)

( * ) Notice: Subject to any disclaimer, the term of this patent is extended or adjusted under 35 U.S.C. 154(b) by 0 days.

(21) Appl. No.: 17/618,156

(22) PCT Filed: Jun. 13, 2020

(86) PCT No.: PCT/FR2020/051017
§ 371 (c)(1),
(2) Date: Dec. 10, 2021

(87) PCT Pub. No.: WO2020/249917
PCT Pub. Date: Dec. 17, 2020

(65) Prior Publication Data
US 2022/0272992 A1    Sep. 1, 2022

(30) Foreign Application Priority Data
Jun. 13, 2019    (FR) ...................................... 1906343

(51) Int. Cl.
*A21D 10/00* (2006.01)
*A21D 8/04* (2006.01)

(52) U.S. Cl.
CPC ........... *A21D 10/005* (2013.01); *A21D 8/045* (2013.01)

(58) Field of Classification Search
CPC ............................. A21D 10/005; A21D 8/045
USPC ......................................................... 426/549
See application file for complete search history.

(56) References Cited

U.S. PATENT DOCUMENTS

2005/0056152 A1*    3/2005    Ishida ....................... C12C 5/00
                                                                99/275

FOREIGN PATENT DOCUMENTS

| FR | 2701356 A1 | 8/1994 |
| FR | 3037773 A1 | 12/2016 |
| WO | 2019068700 A1 | 4/2019 |

OTHER PUBLICATIONS

Philibert et al. FR2701256A1 machine translation (Year: 1994).*
International Search Report dated Aug. 12, 2021, in International Application No. PCT/FR2020/051017 (with English Translation).

* cited by examiner

*Primary Examiner* — Subbalakshmi Prakash
(74) *Attorney, Agent, or Firm* — Maier & Maier, PLLC

(57) ABSTRACT

A cuttable leaven in solid form and to the use of this leaven in a bakery for preparing leaven bread and as a bread-making starter for the preparation of a liquid leaven. The leaven is based on flour of barley, buckwheat, lupine, millet, quinoa, einkorn, Kharagan wheat or mixtures thereof.

11 Claims, 7 Drawing Sheets

L1　　　　　　　L2　　　　　　　L3

L4　　　　　　　L5　　　　　　　L6

US 11,985,982 B2

CUTTABLE LIVE LEAVEN BLOCK

FIELD

The present invention relates to a live leaven that is easy to use and transport and has a long shelf life.

BACKGROUND

Historically, leaven was the very first bread leavening agent used in breadmaking. It is obtained from a mixture of flour and water, in which the metabolic activity of a heterogeneous population of lactic acid bacteria and yeasts takes place, either by spontaneous fermentation ("natural" leaven), or by fermentation initiated by a starter culture, with or without refreshing.

Breadmaking with leaven generates the greatest aromatic richness owing to the use of a complex flora, intimately combining yeasts and bacteria.

To satisfy the needs of the market and simplify the baker's work, various types of products have been proposed, such as starters for leaven, ready-to-use leavens, and devitalized sourdoughs.

Breadmaking starters, which are generally in liquid or pasty form, or in the form of lyophilized powder of microorganisms, allow a leaven to be produced in at least one step and in at least 16 hours. To prepare leaven directly starting from a starter, it is sufficient to put the starter in water for example at a temperature of 30-35° C. and add flour and optionally salt. Once the mixture is homogeneous, the paste is left to ferment for at least 16 h at temperatures generally between 20 and 35° C.

The complete leaven obtained in a single step is then ready to be incorporated in the recipe for making baking dough, for example for bread or brioche, in the same proportions as a spontaneous leaven. Professional breadmakers thus do away with the tricky and risky steps of starting and maintaining a spontaneous leaven. With this method they ensure regularity of performance and reproducibility of the results.

Ready-to-use active live leaven is a "complete" leaven obtained by natural fermentation of cereal flours. It is in liquid form and is incorporated directly during kneading at a level of 5-20% of the total weight of flour. It guarantees bakers a gain in productivity by avoiding the constraints of refreshing, but also deviations resulting from external contamination by undesirable microorganisms.

The applicant has also developed a range of devitalized sourdoughs, which can be incorporated in the kneader without changing the original recipe. They endow the bakery products in which they are used with a typical aromatic flavor specific to fermented cereals.

Even if these products are easier to use than the traditional leaven, bakers need products that give very good reproducibility from batch to batch and that have a long shelf life.

Another range of products useful in breadmaking for improving the organoleptic qualities of bakery products are breadmaking improvers with enzymatic activity, which are used in addition to yeast or leaven. The applicant has developed several of them, and in particular has described, in patent application WO2019/068700, a breadmaking improver consisting of a usual ingredient for improving breadmaking (in particular a mixture of enzymes) and $10^7$ CFU of microorganisms that can be supplied by a leaven. This product is not used as ready-to-use breadmaking leaven, namely as a leavening agent.

Leaven, when it is present in this improver, is a vehicle for the enzyme mixture. The rate of incorporation is too low to cause bread dough to rise, and baker's yeast is added in order to cause the dough to rise.

SUMMARY

The present inventors found that it was possible to have a live leaven in cuttable solid form and therefore easy to dose, having a long shelf life, by selecting the flour used.

More particularly, by appropriate selection of the base flour, the present inventors found that it was possible to obtain a live leaven in cuttable solid form that is easy to dose.

Thus, the present invention relates to a live leaven in cuttable solid form, based on flour of barley, buckwheat, lupine, millet, quinoa, einkorn, Kharagan wheat or mixtures thereof.

DETAILED DESCRIPTION

Figure 1:
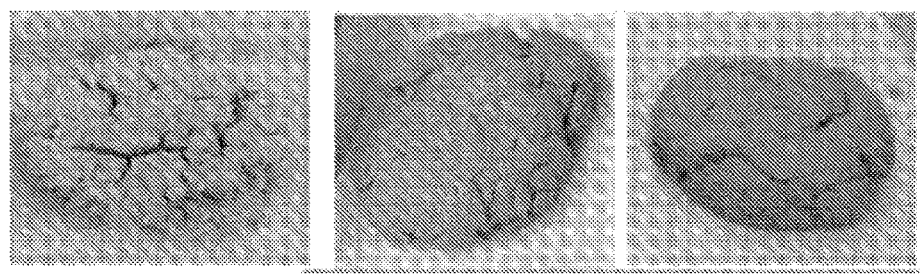
FIG. 1 is a photograph of leavens L1 to L6 prepared in example 1.
Figure 1:
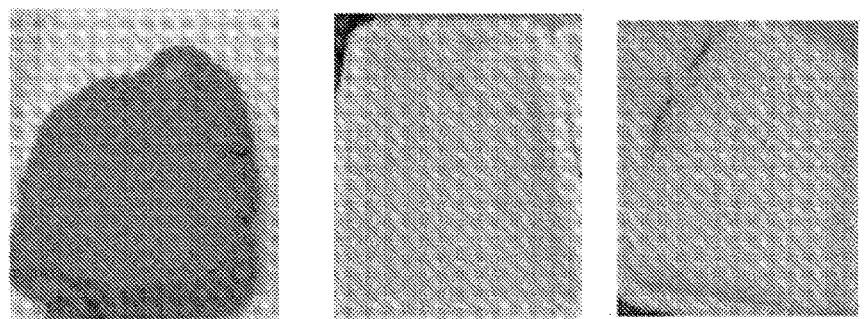

"Leaven" means, in the present invention, a product obtained by putting a starter in water and adding flour, and leaving it to ripen.

Thus, the leaven according to the invention may be a ready-to-use breadmaking leaven or may be a breadmaking starter leaven.

"In cuttable solid form" means a solid block that remains in the form that it has been given and that is divisible into pieces, for example under the pressure of a cheese wire, a knife blade or a dough cutter. Such a block does not crumble, is not friable and does not sag under its own weight. It may be in the form of a block obtained by compaction, wrapped in a suitable film allowing optimal storage of the product. Alternatively, it may be contained in a rigid vessel of the bucket type.

Owing to this cuttable solid form, the leaven according to the invention can be dosed accurately without any difficulty. It is therefore very easy for the baker to use.

The base flour of the leaven according to the invention is selected from the group comprising flour of barley, buckwheat, lupine, millet, quinoa, kamut (or Kharagan wheat), einkorn and spelt.

A mixture of flours may be used.

According to a particular embodiment, the base flour of the leaven is selected from flour of barley, buckwheat, lupine, millet, quinoa or mixtures thereof.

According to the invention, flours are preferred that have an ash content from 0.35 to 2.50%, preferably from 1 to 2.2%, more preferably from 1.5 to 2 wt % per 100% of flour dry matter.

According to the invention, flours are preferred that have a protein content from 5 to 45 g/100 g of flour, preferably from 8 to 30 g/100 g of flour, even more preferably from 10 to 15 g/100 g of flour.

According to a particular embodiment, the base flour of the leaven according to the invention is selected from barley flour, buckwheat flour, or mixtures thereof.

The leaven flavors will be different depending on the flour used. In particular, different flavors are developed by adjusting the ratio of barley flour to buckwheat flour.

The leaven according to the invention is microbiologically stable for at least 10 days, preferably at least 20 days and preferably for up to 8 weeks, preferably at a positive cold temperature (2-8° C., preferably +4° C.). Thus, it can be stored while retaining its activity.

The microbiological stability is such that the decrease in the content of lactic acid bacteria is at most 2 log in the 2 months following its preparation.

The leaven according to the invention has very interesting gustatory qualities, which remain stable for at least 10 days, preferably at least 20 days and preferably for up to 8 weeks.

Owing to its good stability, the leaven according to the invention can be stored for several weeks, up to 8 weeks. For further improvement of its shelf life, it can be stored in suitable packaging of the polyethylene film type or a polypropylene plastic bucket.

The leaven according to the invention has a hydration level from 45 to 95%, preferably from 50 to 70%. "Hydration level" means the amount of water added per 100 units of flour mixed with the starter.

According to one embodiment, the leaven according to the invention comprises:
Barley flour and/or buckwheat flour: 100%
Starter: 0.2-5%, preferably 0.3-2%
  Salt: 0-2%
  Water: 45-75%, preferably between 60 and 70%,
  the percentages being as baker's percentage, i.e. per 100 parts of flour.

The invention also relates to the use of the cuttable leaven for making sourdough bread.

For making sourdough bread, the level of incorporation of the leaven is greater than 10%, preferably from 11 to 35%, even more preferably from 15 to 20% in 100 parts of flour.

For use in the production of sourdough bread, the leaven according to the invention has a hydration level from 45 to 95%, preferably from 50 to 70%. "Hydration level" means the amount of water added per 100 units of flour mixed with the starter.

The invention also relates to the use of the cuttable leaven as breadmaking starter for preparing liquid leavens.

In this use, the level of incorporation of the leaven is from 5 to 25%, preferably from 10 to 15% in 100 parts of flour.

In this use, the leaven according to the invention has a level of hydration from 100 to 200%, preferably 150%. "Hydration level" means the amount of water added per 100 units of flour.

The acidification power of the breadmaking starter leaven according to the invention is entirely satisfactory and can be maintained for up to 11 weeks.

The invention will be described in more detail with the examples, which are given purely for purposes of illustration.

EXAMPLES

Example 1: Preparation of Leavens

Six different leavens are prepared starting from a commercial starter Livendo® LV1 marketed by the Lesaffre company, using different flours with fermentation of 20 h at 30° C.

TABLE 1

| Composition | quantity |
| --- | --- |
| Flour | 100% |
| Water | As required |
| Salt | 1.5% |
| Livendo ® LV4 | 0.5% |
| Kneading | 5 min |

The type of flour and the hydration level are indicated in Table 2 below for each of the leavens prepared, L1 to L6.

TABLE 2

| Leaven | Flour | Ash content (% ash to % flour dry matter) | Protein content (g/100 g of flour) | Hydration, % |
| --- | --- | --- | --- | --- |
| L1 | Maize | 0.64 | 5.84 | 75 |
| L2 | Barley | 1.93 | 9.7 | 70 |
| L3 | Buckwheat | 1.92 | 12.89 | 55 |
| L4 | Rye T170 | 1.70 | 8.52 | 75 |
| L5 | Wheat T55 | 0.54 | 11.22 | 55 |
| L6 | Millstone | 0.64 | 5.84 | 55 |

Figure 2:
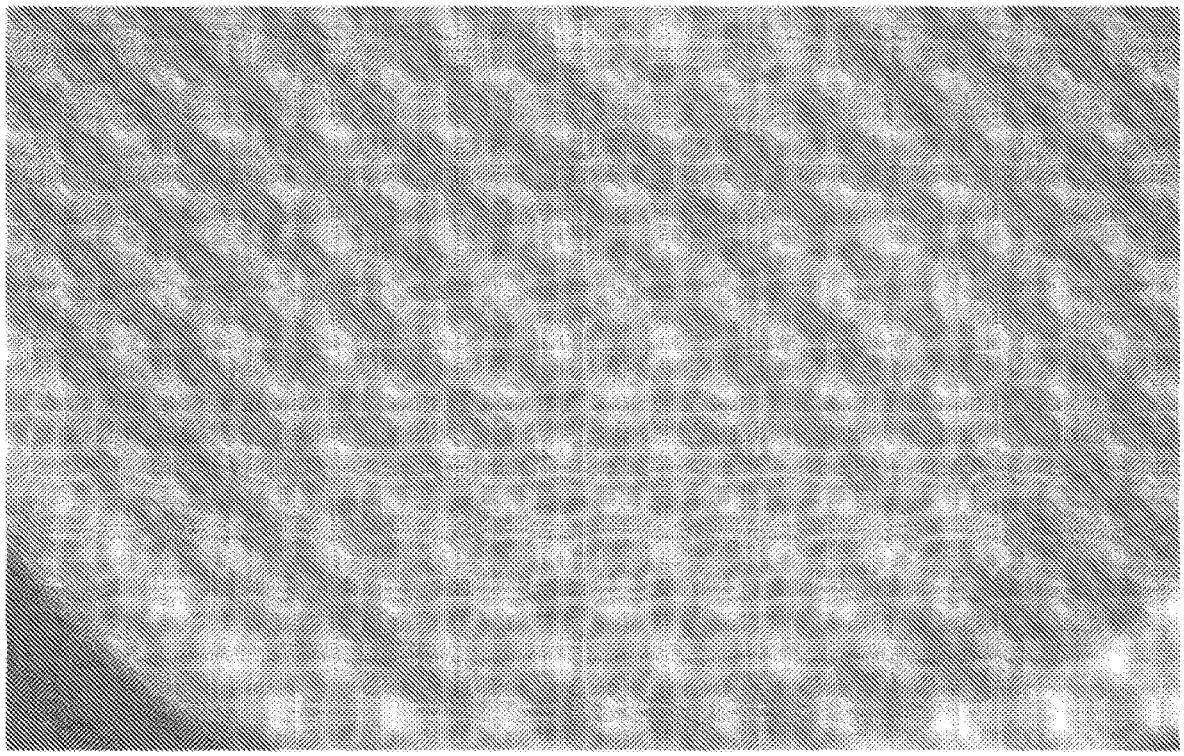
FIG. 2 is a photograph of leaven L5 prepared in example 3.
Figure 3:
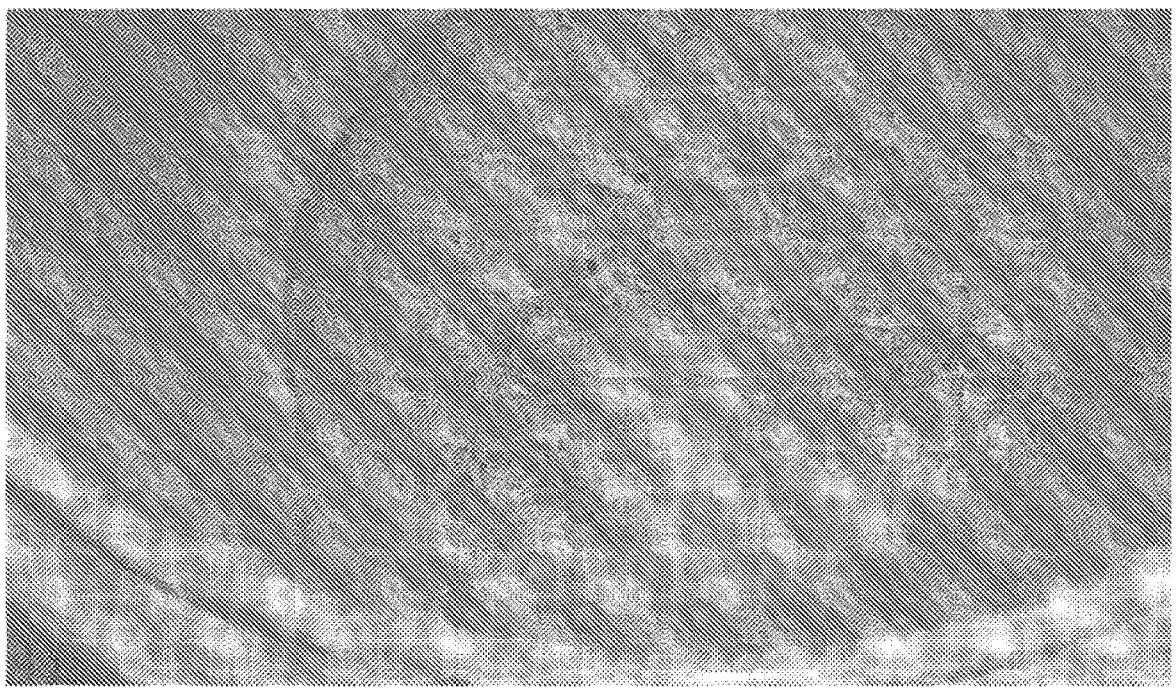
FIG. 3 is a photograph of leaven L7 prepared in example 3.
Figure 4:
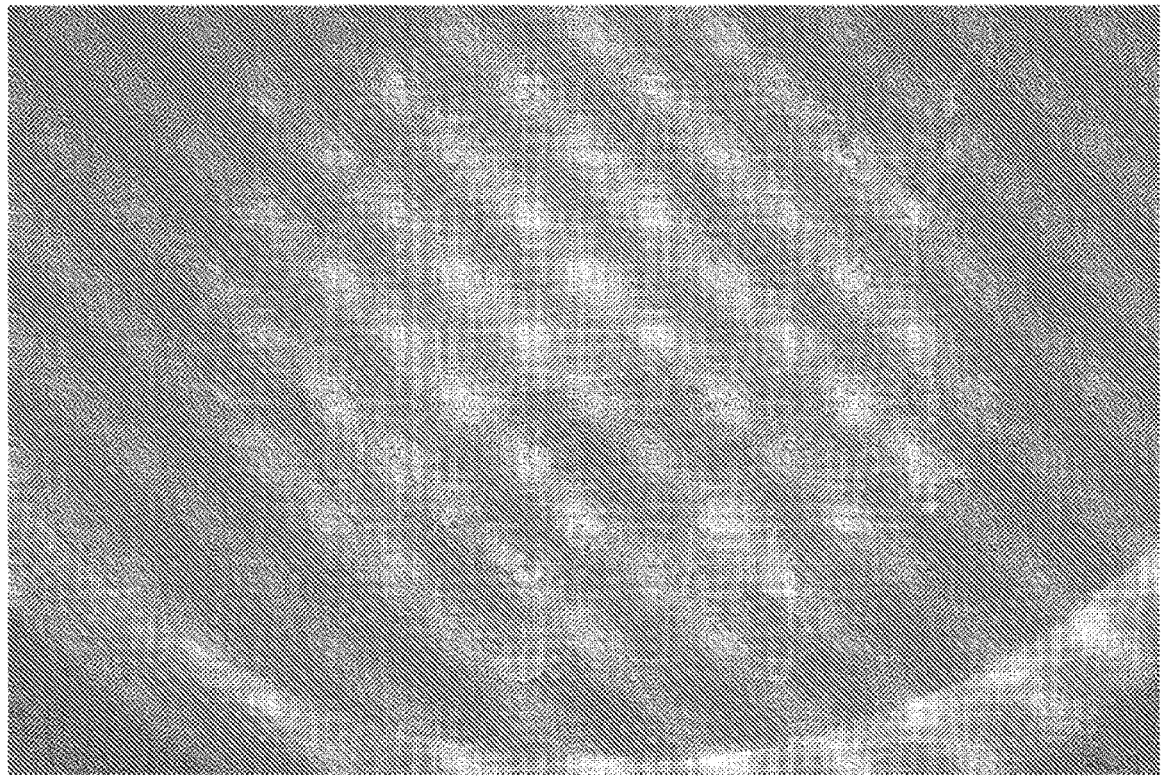
FIG. 4 is a photograph of leaven L9 prepared in example 3.
Figure 5:
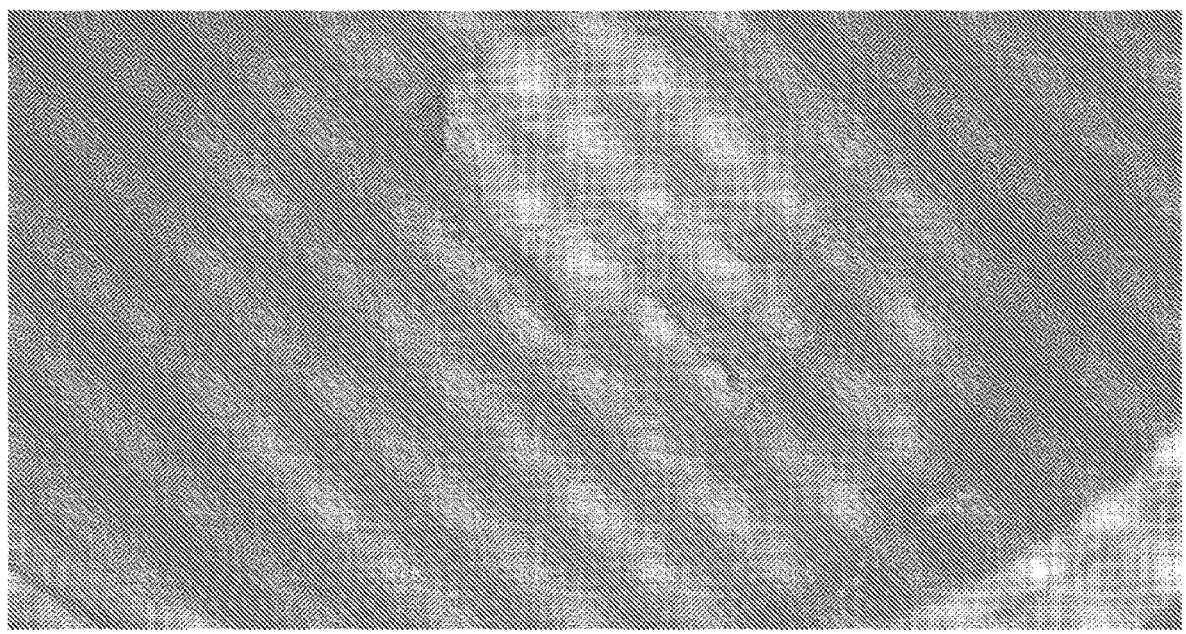
FIG. 5 is a photograph of leaven L10 prepared in example 3.
Figure 6:
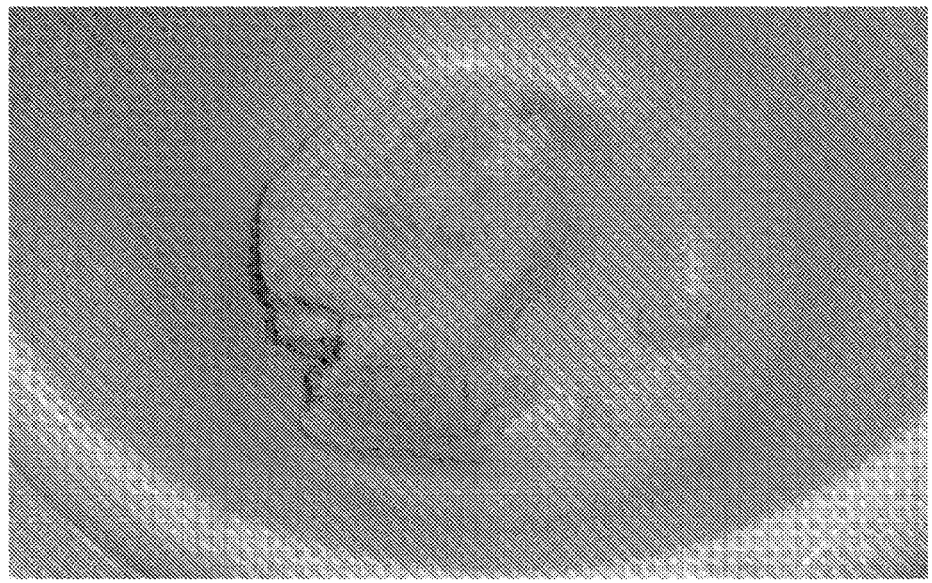
FIG. 6 is a photograph of leaven L11 prepared in example 3.
Figure 7:
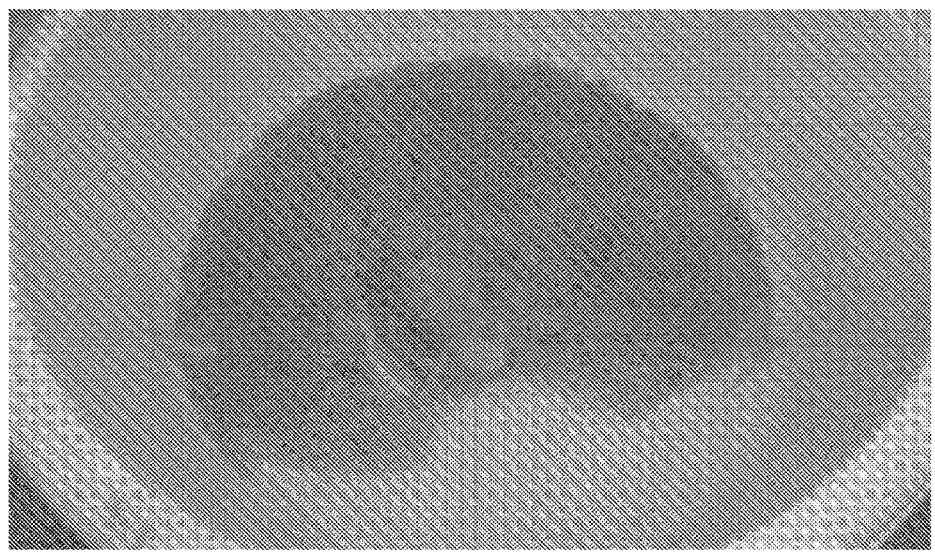
FIG. 7 is a photograph of leaven L12 prepared in example 3.
Figure 8:
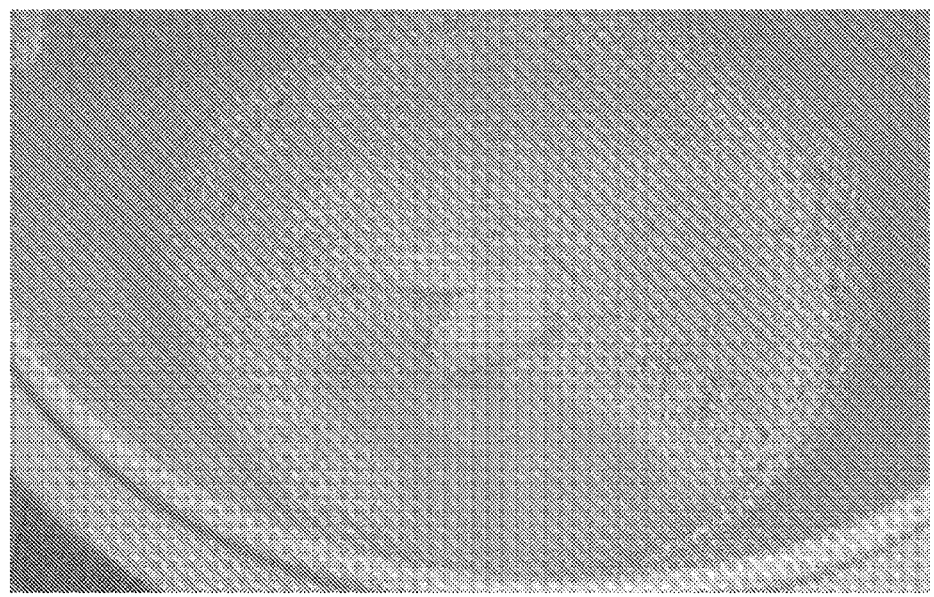
FIG. 8 is a photograph of leaven L13 prepared in example 3.
Figure 9:
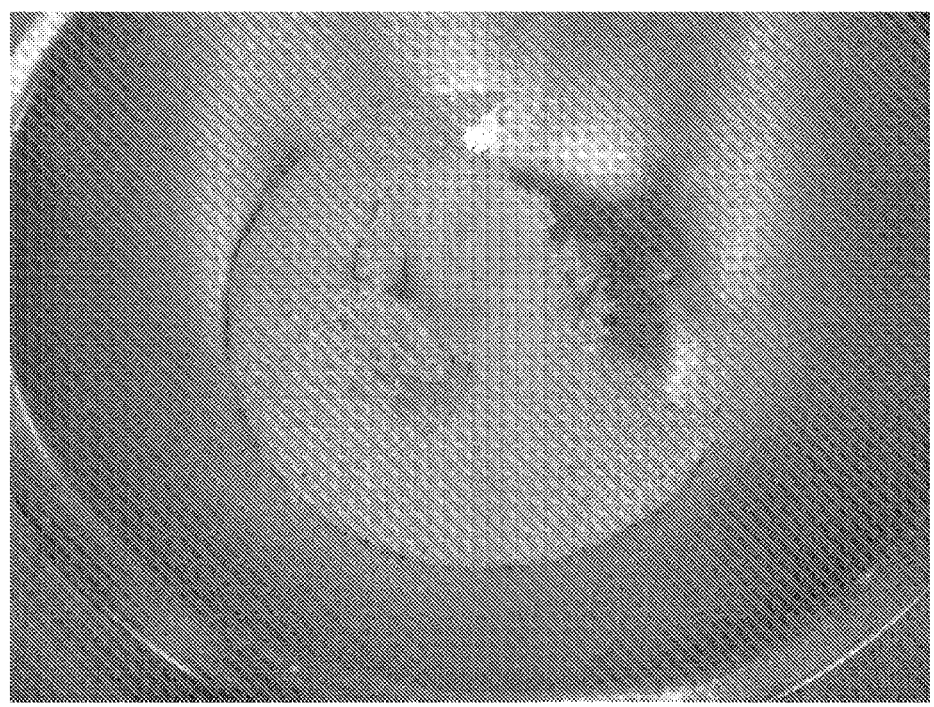
FIG. 9 is a photograph of leaven L14 prepared in example 3.
Figure 10:
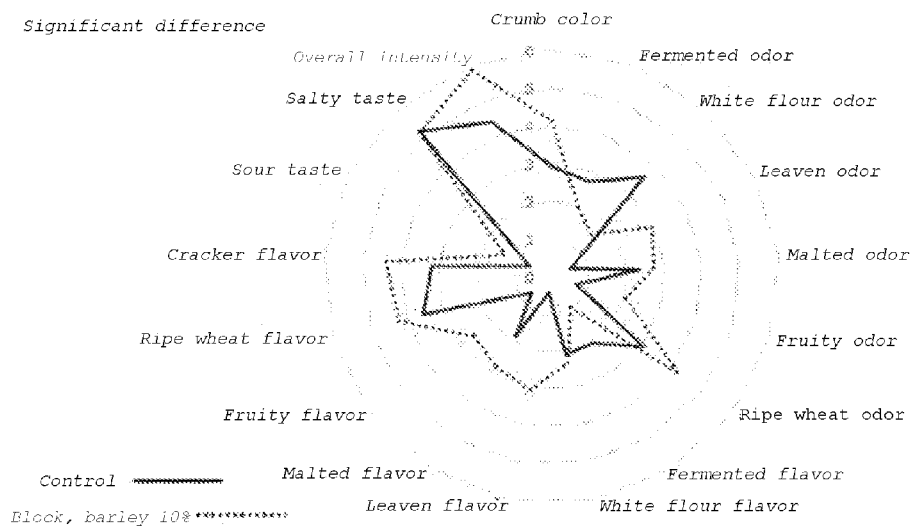
FIG. 10 is a sensory diagram constructed for bread prepared according to example 2 and a control sourdough bread.

The appearance and the durability of the leavens was assessed with the naked eye before compacting. The photographs of the different leavens are given in the appended FIG. 2.

It is clear from naked-eye observation that:
- leavens L5 and L6 do not form a compact mass, but disintegrate;
- leaven L1 forms a noncoherent mass that breaks into smaller blocks;
- leavens L2, L3 and L4 form a solid block.

The solid blocks formed from the leavens were cut with a cheese wire.

Cutting was easy for leavens L2 and L3 but was not possible for leaven L4.

The pH was measured at time 0. The total titratable acidity TTA and the SG (Sauergrad) value were also measured.

For these analyses, 10 g of leaven was put in a graduated beaker and distilled water was added at a rate of 90 mL (10:90 w/w). The pH was measured using a pH meter and the TTA was measured by acid/base volumetric determination with N/10 sodium hydroxide solution until pH=6.6 was reached, and the SG value was measured in the same way as the TTA but reaching a pH of 8.5.

The results are presented in the following table for the value at TO:

TABLE 3

| Leaven | pH | TTA | SG |
|---|---|---|---|
| L1 | 4.5 | 2.8 | ND |
| L2 | 4.2 | 8.2 | ND |
| L3 | 5.2 | 5.2 | ND |
| L4 | 5.2 | 4.2 | ND |
| L5 | 3.8 | 7.8 | ND |
| L6 | 3.9 | 7.1 | ND |

For leaven L2, the measurements were also carried out weekly for 8 weeks. The results are presented in Table 4 below:

TABLE 4

| Block of leaven | pH | TTA | Sg |
|---|---|---|---|
| From | 4.1 | 15 | 21 |
| 2 weeks | 4.1 | 16.7 | 22 |
| 3 weeks | 4.0 | 18.4 | — |
| 4 weeks | 4.1 | 18.8 | 24.5 |
| 5 weeks | 4.0 | 19.5 | 24.3 |
| 6 weeks | 3.9 | 20.7 | 25.5 |
| 7 weeks | 4.0 | 19.7 | 24.6 |
| 8 weeks | 4.0 | 21 | 25.0 |

Leaven L2 showed stability at the level of the acidity (no appearance of off-notes) for 8 weeks at 4° C.

The bacteriological stability was evaluated for leaven L2 for 8 weeks with different inocula, by measuring the mesophilic aerobic flora (30° C.) according to standard NF EN ISO 4833-1 and the heterofermentative lactic acid bacteria in 3M 01/19-11/17 medium. The results obtained are presented in Table 5 below.

TABLE 5

| Sample | Lifetime | Mesophilic aerobic flora (30° C.) (CFU/g) | Heterofermentative lactic acid bacteria (CFU/g) |
|---|---|---|---|
| Leaven on barley - inoculum 0.5% Livendo ® LV4 | 1 week | ND | 9.30E+08 |
| | 4 weeks | 7.60E+05 | 2.40E+08 |
| | 8 weeks | 1.50E+05 | 9.80E+06 |

Leaven L2 has satisfactory bacteriological stability. It remains active even after 8 weeks of storage.

Stability was also observed according to the following parameters: liquefaction/loss of moisture, change in color and odor of the blocks. These parameters were found to be stable for 8 weeks.

Figure 11:
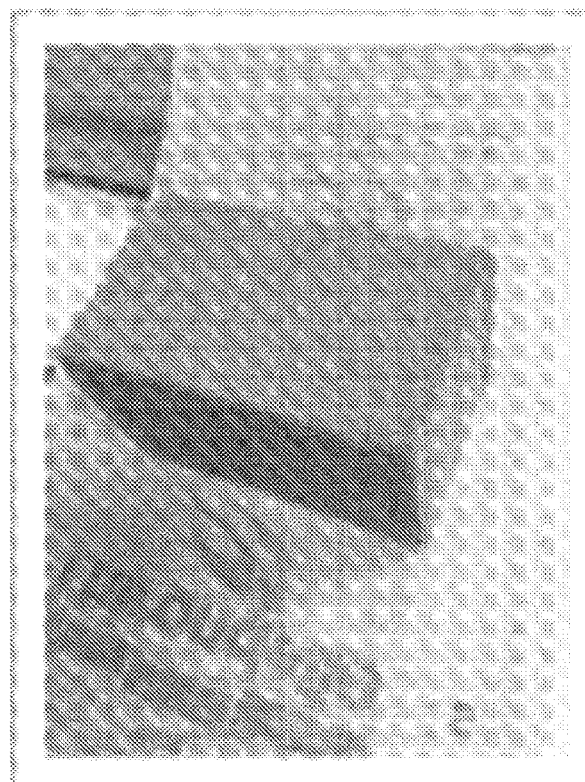
FIGS. 11 and 12 are photographs of a nonfriable, cuttable compressed block of leaven L2.
Figure 12:

A 0.5 kg block and a 1 kg block of leaven L2 were compacted in brick shape and were photographed (see FIGS. 11 and 12).

Example 2

The different leavens prepared in example 1 above were used for preparing sourdough breads, with the following composition:

TABLE 6

| Ingredients | kg | % |
|---|---|---|
| Wheat flour | 1000 | 100 |
| Water | 700 | 70 |
| Salt | 21 | 2.1 |
| Compressed yeast | 5 | 0.5 |
| Croustilis ® 0.5% | 3 | 0.3 |
| Leaven of the invention | 100 | 10 |
| Total | 2962.5 | |

The breadmaking flowsheet is given below in Table 7:

TABLE 7

| STEPS | |
|---|---|
| Kneading | 8 minutes at speed 1 + 2 minutes at speed 2 |
| Initial fermentation | 2 h at room temperature (20-24° C., about 22° C.) |
| Division | 400 g |
| Rounding | Yes |
| Expansion | 15 minutes |
| Shaping | By hand |
| Final proving | 2 h at 26° C. |
| Scarification | |
| Cooking | 25 min at 250° C. vacuum cooking |

For bread prepared starting from leaven 2, very good stability of pH and TTA was observed over a period of 8 weeks. The values were as follows:

TABLE 8

| | On the crumb | | |
|---|---|---|---|
| Bread (4.5 h) | pH | TTA | Sg |
| Leaven T0 15% | 4.99 | 4.2 | 7.7 |
| Leaven T0 30% | 4.79 | 7.3 | 11.2 |
| Leaven T8 15% | 4.98 | 4.5 | 7.78 |
| Leaven T8 30% | 4.71 | 6.5 | 10.4 |

An organoleptic analysis was carried out on these two loaves, with on the one hand a traditional control baguette made with wheat flour, and on the other hand a baguette with block leaven with barley at 10% seeded with the Livendo LV4 starter. This analysis is based on a QDA test; the results were processed with Fizz software. Ten panellists, Odor & Taste experts, specially trained for the analysis, compared the products, and scored the differences on a scale from 0 to 10.

TABLE 9

| | Baguette with barley block leaven 10% | Control baguette |
|---|---|---|
| Appearance | Darker crumb color | Crumb color cream white flour fermented |
| odor | More leaven | |
| flavor | Overall taste more intense More leaven More fruity (than the control) | |

The results obtained are summarized in the above table, and are detailed in the diagram in FIG. 11. For both breads, a typical flavor is found, specific to fermented cereals. The crumb of the bread of the invention is more colored and the taste of the bread according to the invention is more intense than that of the control bread with more intense "leaven and fruity" notes.

Example 3

Eight different leavens are prepared starting from a commercial starter SAF Levain and using different flours with fermentation of 24 h at 35° C.

The type of flour and the hydration level are indicated in Table 8 below for each of the leavens prepared, L7 to L14:

TABLE 10

| Leaven | Flour | Ash content (% ash to % of flour dry matter) | Protein content (g/100 g of flour) | Hydration, % |
|---|---|---|---|---|
| L5' | Wheat | 0.54 | 11.22 | 55 |
| L7 | Triticale | 1.7 | 10.37 | 63 |
| L8 | Rice | 0.35 | 7.51 | 83 |
| L9 | Millet | 0.75-2.40* | 11 | 61 |
| L10 | Quinoa | 2.46-3.36* | 13 | 65 |
| L11 | Lupine | 2-4* | 38-42* | 85 |
| L12 | Einkorn | 1.43 | 15.64 | 61 |
| L13 | Spelt | 0.75 | 13.46 | 61 |
| L14 | Kharagan wheat (known by the designation Kamut) | 1.76 | 14.96 | 50 |

*Theoretical values

The appearance and the durability of the leavens were assessed with the naked eye. Photographs of the different leavens are given in FIGS. 2 to 10.

It is clear from naked-eye observation that:
leavens L7, L8, and L13 do not form a compact mass, but disintegrate;
leavens L9, L10, L11, L12 and L14 form a solid block.
The solid blocks formed from the leavens were cut with a cheese wire.

TABLE 11

| STEPS | |
|---|---|
| Kneading | 5 minutes at speed 1 + 2 minutes at speed 2 |
| Initial fermentation | 2 h at room temperature (20-24° C., about 22° C.) |
| Division | 450 g |
| Rounding | Yes |
| Expansion | 30 minutes |
| Shaping | By hand- Short French stick |
| Final proving | 2 h at 28° C. Berlin proving 80 g: 200 ml |
| Scarification | 1 scarification |
| Cooking | 25 min at 250° C. vacuum cooking |

For each bread obtained, the values of pH, TTA and SG were measured on the crumb.

TABLE 12

| Crumb | pH | TTA | SG 5 |
|---|---|---|---|
| Bread with L5 | 4.5 | 2.8 | nd |
| Bread with L7 | 4.23 | 16.42 | 23.28 |
| Bread with L8 | 5.12 | 2.34 | 4.02 |
| Bread with L9 | 4.40 | 14.65 | 21.82 |

TABLE 12-continued

| Crumb | pH | TTA | SG 5 |
|---|---|---|---|
| Bread with L10 | 4.30 | 22.08 | 34.28 |
| Bread with L11 | 4.99 | 15.01 | 23.27 |
| Bread with L12 | 4.35 | 13.42 | 19.75 |
| Bread with L13 | 4.25 | 13.38 | 19.05 |
| Bread with L14 | 4.41 | 13.24 | 19.24 |

The values obtained were entirely satisfactory.

An organoleptic analysis was carried out on these breads. This analysis is based on a QDA test; the results were processed with Fizz software. Ten panellists, Odor & Taste experts, specially trained for the analysis, compared the products, and noted the flavors and odors.

TABLE 13

| | Odor | Taste |
|---|---|---|
| Bread with L5 | Ripe wheat | Ripe wheat, Round |
| Bread with L7 | Acetic, Leaven, Olive | Very salty, not acetic |
| Bread with L9 | Fatty, malted | Fatty, Cake |
| Bread with L10 | Rice/Maize | Quinoa, Rice |
| Bread with L11 | Ripe wheat, fatty | Fatty, Floral |
| Bread with L12 | Soap, paint | |
| Bread with L13 | +green | |
| Bread with L14 | Lightly smoked | Fatty |

The breads made with leavens L9, L10 and L11 had entirely satisfactory organoleptic qualities.

Example 4

Breadmaking starter leavens were prepared as follows:

| Composition of starter leaven | Recipe (wt % of flour) |
|---|---|
| Barley flour | 100 |
| Water at 30° C. | 62.8 |
| Starter (leaven cream) | 10 |
| Enzymatic improver (Pro 404) | 0 |

Using this composition, breadmaking starter leavens were prepared by the following different methods (with or without refreshing)

| Method | Method 1 | Method 2 |
|---|---|---|
| Ripening time | 24 h | 24 h |
| Ripening temperature | 32° C. | 32° C. |
| Subculturing | No | Once |

Refreshing was carried out with the following formula:

| | |
|---|---|
| Barley flour | 92.9% |
| Water | 63.9 |
| Starter leaven | 15% |

After 8 weeks of storage, the bacteria present in the breadmaking starter leavens still have viability above $10^7$ CFU/g.

Example 5

The breadmaking starter leavens prepared in example 4 are used for preparing liquid breadmaking leavens based on wheat flour.

Different batches were prepared with the freshly prepared leavens (T0), the leavens stored for 7 weeks (T7) and stored for 11 weeks (T11) at +4° C. The composition of the liquid leavens is as follows:

| Ingredients | Quantity |
| --- | --- |
| T55 wheat flour | 100% |
| Water 30° C. | 150% |
| Starter leaven from example 4 | 10% |
| Ripening time | 24 h |
| Ripening temperature | 30° C. |

All the batches of liquid leavens obtained had satisfactory pH and total contents of acids, even the batches obtained with the starter leaven stored for 11 weeks.

The results of measurement of acid in the liquid leaven obtained from the starter leaven with refreshing (starter leaven from example 4 with method 2) are given in the following table in comparison with different liquid leavens obtained in the same way but with commercial frozen starters.

| Starter | pH | TTA |
| --- | --- | --- |
| According to the invention | 3.8 | 7.9 |
| Livendo LV1 | 4.1 | 4.3 |
| Livendo LV2 | 4.2 | 3.9 |
| Livendo LV3 | 3.6 | 5.7 |

(the values given for the leavens with Livendo starter are estimates obtained with "My sourdough App").

The liquid leaven obtained from the starter leaven of the invention has a very interesting acidification power, slightly more powerful than the commercial frozen starter leavens.

The invention claimed is:

1. A live leaven, comprising a starter culture, water, and flour, wherein said live leaven is in cuttable solid form and said live leaven is based on flour of barley, buckwheat, lupine, millet, quinoa, einkorn, or mixtures thereof, and said live leaven has a hydration level from 45 to 95%.

2. The live leaven as claimed in claim 1, wherein said live leaven is based on flour of barley, buckwheat, lupine, millet, quinoa or mixtures thereof.

3. The live leaven as claimed in claim 1, wherein the flour is barley flour and/or buckwheat flour.

4. The live leaven as claimed in claim 1, wherein the flour has an ash content from 0.35 to 2.50 wt % of flour.

5. The live leaven as claimed in claim 1, wherein the flour has a protein content from 5 to 45 g/100 g of flour.

6. The live leaven as claimed in claim 1, comprising:
Flour: 100%
Starter: 0.2-5%,
Salt: 0-2%
Water: 45-75%,
the percentages being per 100 parts of flour.

7. The live leaven as claimed in claim 1, said live leaven has a bacteriological stability over a period of 2 months such that the decrease in the content of lactic acid bacteria is at most 2 log in the 2 months following its preparation.

8. A ready-to-use leaven for preparing a sourdough bread, comprising the live leaven as claimed in claim 1.

9. The ready-to-use leaven as claimed in claim 8, according to which a rate of incorporation of the live leaven is from 10 to 35% in 100 parts of flour.

10. A breadmaking starter for preparing liquid leaven comprising the live leaven as claimed in claim 1.

11. The breadmaking starter, according to claim 10, which the rate of incorporation of the live leaven is from 5 to 25% per 100 parts of flour.

\* \* \* \* \*